United States Patent [19]
Garcia-Gutierrez et al.

[11] Patent Number: 5,751,535
[45] Date of Patent: May 12, 1998

[54] CONTROL CIRCUITS FOR AN ELECTROMAGNETIC FLOW METER

[75] Inventors: Pedro A. Garcia-Gutierrez; Jesus Fraile-Mora, both of Madrid, Spain

[73] Assignee: Qualitas Asessoria Profesional, S.A., Madrid, Spain

[21] Appl. No.: 543,822

[22] Filed: Oct. 16, 1995

[30] Foreign Application Priority Data

Oct. 26, 1994 [ES] Spain ................................. 9402225

[51] Int. Cl.$^6$ ................................. G01F 1/58
[52] U.S. Cl. ................................. 361/143; 73/861.11
[58] Field of Search ................... 73/861.01, 861.02, 73/861.03, 861.08, 861.11, 861.12, 861.13, 861.16, 861.17; 361/143, 146, 152, 157, 139, 140, 154

[56] References Cited

U.S. PATENT DOCUMENTS

| | | | |
|---|---|---|---|
| 3,820,392 | 6/1974 | Beck et al. | 73/861.06 |
| 3,965,738 | 6/1976 | Watanabe | 73/861.17 |
| 4,144,751 | 3/1979 | Yokoyama | 73/861.11 |
| 4,488,438 | 12/1984 | Tomita | 73/861.12 |
| 4,773,274 | 9/1988 | Kobayashi et al. | 73/861.16 |
| 4,856,345 | 8/1989 | Mochizuki | 73/861.17 |

*Primary Examiner*—Fritz Fleming
*Attorney, Agent, or Firm*—Helfgott & Karas, P.C.

[57] ABSTRACT

The control circuits for the electronic flow meter which are the subject of this invention and whose purpose is to meter with precision the flow through a pipe, eliminating disturbances caused by the metering procedure use, consist of an excitation block (2) of coils (B1 and B2) for the magnetic circuit and a processing block (3) for the metering signal which is captured through sensors (S) arranged orthogonally to the magnetic circuit pole components.

6 Claims, 3 Drawing Sheets

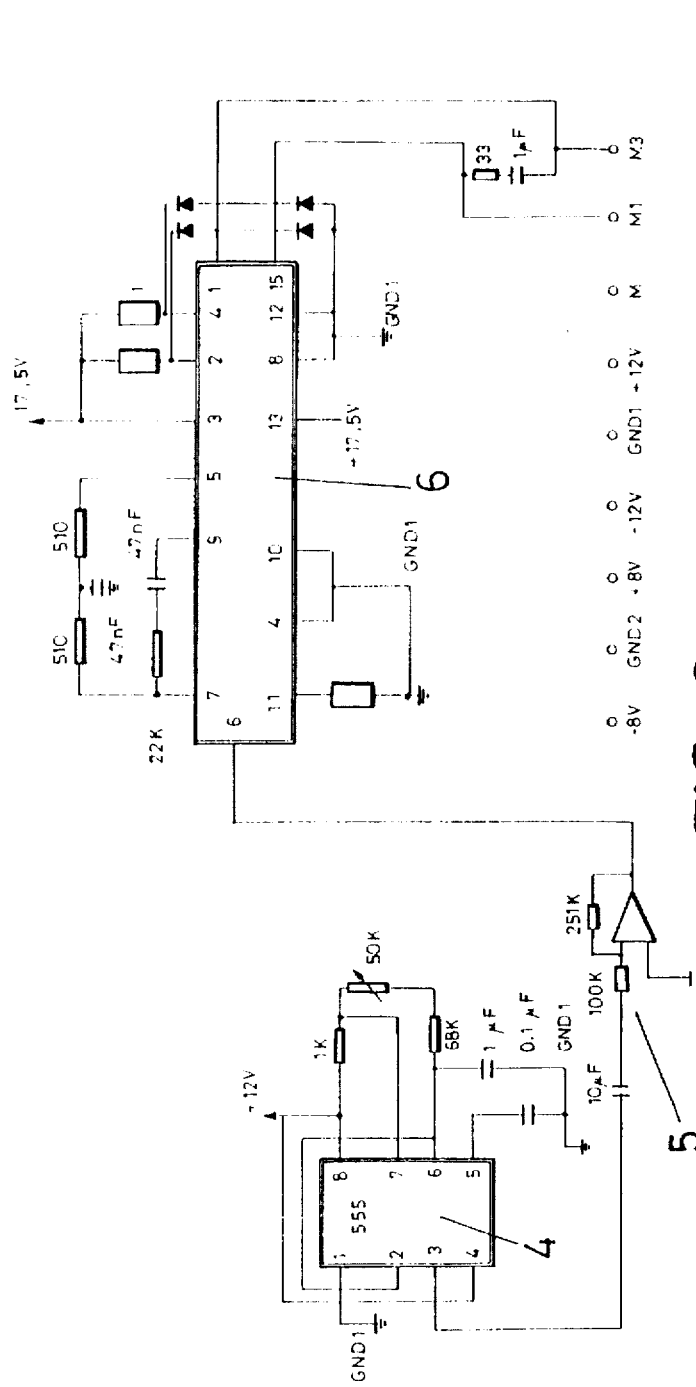
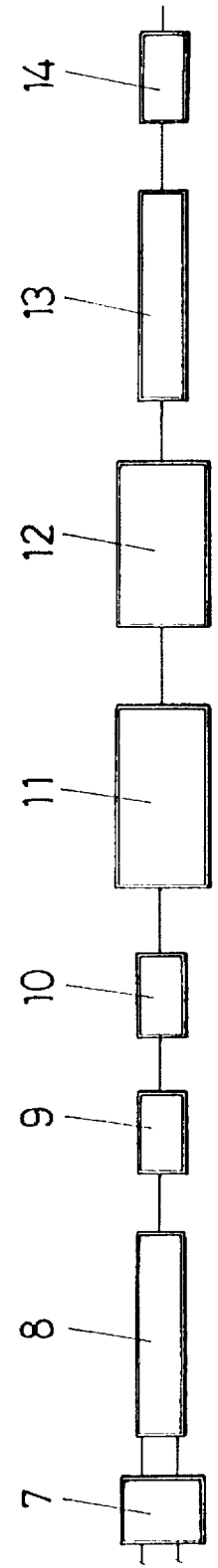
FIG.-2
FIG.-3

CONTROL CIRCUITS FOR AN ELECTROMAGNETIC FLOW METER

SUBJECT OF THE INVENTION

As stated in the heading to these Specifications, this invention refers to an electro-magnetic flow meter designed for the accurate metering of the flow through a pipe, to the specific coil excitation circuits and those for the detection and processing of the metering signal, and making it possible to eliminate perturbations generated by the metering technique employed.

STATE OF THE ART

An electromagnetic flow meter is a system for measuring fluids in piping, and consists of a cylindrical tube through which the fluid flows. Said tube is under the influence of a magnetic field generated by two coils, one each over and under the tube. There are two electrodes, diametrically opposite, arranged on the system's symmetrical plane.

The flow meter's operation is based on Faraday's Law according to which the electromotive force induced in a flux moving within a magnetic field is proportional to the speed of the flux. In electromagnetic flow meters, the flux is the actual fluid in movement, which must have a minimum conductivity threshold (2–20 microsiemens/sec). The magnetic field produced by the currents flowing through the excitation coils induces an electromotive force in the flux which is proportional to its speed, and at right angles to it and to the magnetic field itself.

If the flow is to be measured by sampling the electromotive force signal, the magnetic induction value of the field created by the coils must remain constant throughout the sampling period.

The key to a magnetic flow meter is the control of the magnetic field, this being the content of the proposed invention.

Usually, in commercial units, the coil windings are fed from a square-wave voltage source with a constant half-cycle value. Main features are, on the one hand, the square wave switching frequency, with a value associated with the mains frequency while, on the other, a change in the environmental conditions (temperature, etc.) produces a change in the intensity flowing through the coil windings.

The electromotive force detected in the electrodes of these units must be processed in special comparison circuits, which remove the influence of:

Perturbations in the power supply.

Changes in environmental conditions.

Units do exist in which the coils are excited by superimposing a number of voltage supplies with square waves of differing frequencies, or by using a sine AC voltage supply.

DESCRIPTION OF THE INVENTION

The control circuits of an electromagnetic flow meter as proposed in the invention feed the induction coils from a square-wave constant half-cycle current generator.

This is obtained with a transadmittance amplifier and an oscillator.

The main features of this power supply are, firstly the use of an unsampled mains switching frequency which is independent of the mains to prevent harmonic interference and, secondly, its very high half-cycle stability, irrespective of environmental conditions (temperature etc.).

The main advantages of this approach are that a harmonic-free and highly stable magnetic field enables an electromotive force signal to be captured at the electrodes without any perturbations. In the first instance, this simplifies subsequent processing of the electromotive force signal: however, in addition, at very low fluid speeds, the factor limiting the flow meter's sensitivity is the signal/signal-noise ratio of the electromotive force signal. A perturbation-free stable magnetic field is essential for accurate flow metering when fluid movement is very slow.

To attain these ends, the flow meter magnetic circuit consists of two coils, each of n loops, connected in series, through which a current is circulated. Said coils are installed on a magnetic structure made of iron plate. The magnetic field lines are closed through it and the fluid. To complete the structure, two electronic blocks form the control circuits. They may be referred to as the coil excitation block and the metering signal detection, conditioning and processing block.

The excitation block, consisting of the coil excitation circuit, includes an oscillator or excitation control signal generator circuit followed by an amplifier which supplies the input signal to an integrated input-tension-controlled LSI transadmittance circuit supplying constant current to the excitation coils.

The second block, which handles the signal which eventually provides the flow measurement, captures, processes and amplifies the signal, which flows through a component to eliminate the capacitive effects of conduction, through an amplifier, high-pass and low-pass filters, an attenuation unit, a true efficient value convertor and an amplifier which establishes a suitable signal level.

All the sections of the circuit are fed from a multiple power supply in which account is taken of the necessary polarization tensions for all the circuit elements and which is able to supply the intensity required by each section.

Such a structure meets the objectives established for the design of a flow meter able to meter accurately and without errors the flow of a fluid through a pipe, by overcoming or eliminating all agents which may cause perturbations in the measurement of the induced tension and those arising from the flow speed which is the element which, in the long run, determines the flow.

The proposed control circuits can be used to meter flow in circular systems operating under load, and in circular systems operating in free-flow conditions.

They can also be used to control magnetic flow meters in canals or rivers, in which case the single magnetic field generating coil is located over the canal or river, with the electrodes in the bottom of each housing.

DESCRIPTION OF THE DRAWINGS

To complete this description and to aid in a better understanding of the features of the invention, these Specifications are accompanied by a set of drawings, forming an integral part hereof which, by way of illustration only and without limitation, show the following:

FIG. 2 shows the electronic diagram of the coil excitation circuit.

FIG. 3 is a block diagram of the metering signal processing signal following capture of the signal.

A PREFERENTIAL EMBODIMENT OF THE INVENTION

From the figures, it can be seen that the flow meter control circuits are associated with a magnetic circuit that has a support structure (1) for the coils (B1) and (B2) to create the constant magnetic field, and the induced tension sensors or electrodes (5).

The control circuits advocated here comprise the excitation block (2) which supplies the coil excitation current, and the metering signal amplifier and processing block (3).

Figure 1:
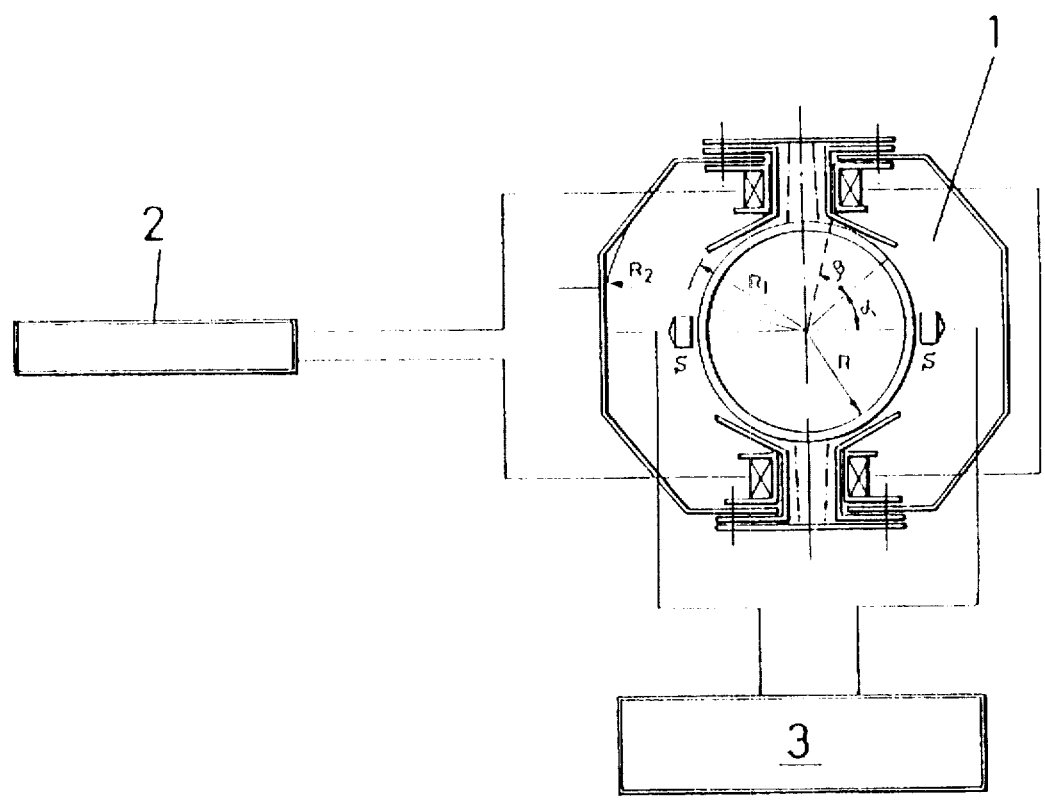
FIG. 1 a general diagram of all the elements making up the flow meter, the coil support structure, the excitation block and the signal amplification and processing components.

In one design of the invention, the support structure (1) takes the form of a 40 cm diameter pipe with 600 loops per coil, to give total resistance of 33.4 ohms. The pole components are 9 cm deep, radius R1 is 24 cm, while R2 is 31 cm, with an angel b of 52° and an angel of 21° angles. The total experimentally-measured inductance of the winding (two coils in series) is 0.8 henrys, and the L/R winding time constant is 0.024 seconds, 31.16% of the excitation signal period. The sensors (S) are stainless steel, to resist attack from the fluid as well as possible deposits. As can be seen from FIG. 1, sensors (S) are arranged orthoginally respect to the pole components.

The excitation block (2) whose circuit is shown in FIG. 2 comprises an excitation control signal generator circuit designed to generate a 6.5 Hz control base wave of zero continuous level and a 50% working cycle, to provide a +11 V signal at the input to a integrated circuit for the excitation of the coils (B1 and B2). The excitation control signal generator circuit consists of a 6.5 Hz generator (4) followed by a continuous level suppressor and amplifier (5) which takes the form of a 6.5 Hz oscillator based on the CI 555, a high-pass band filter and an amplification unit implemented by means of an operational amplifier.

The coil excitation circuit (6) is an integrated LSI transadmittance circuit controlled by the input tension, and able to supply a maximum 2 A current with gain loop adjustment by means of external components.

Figure 4:
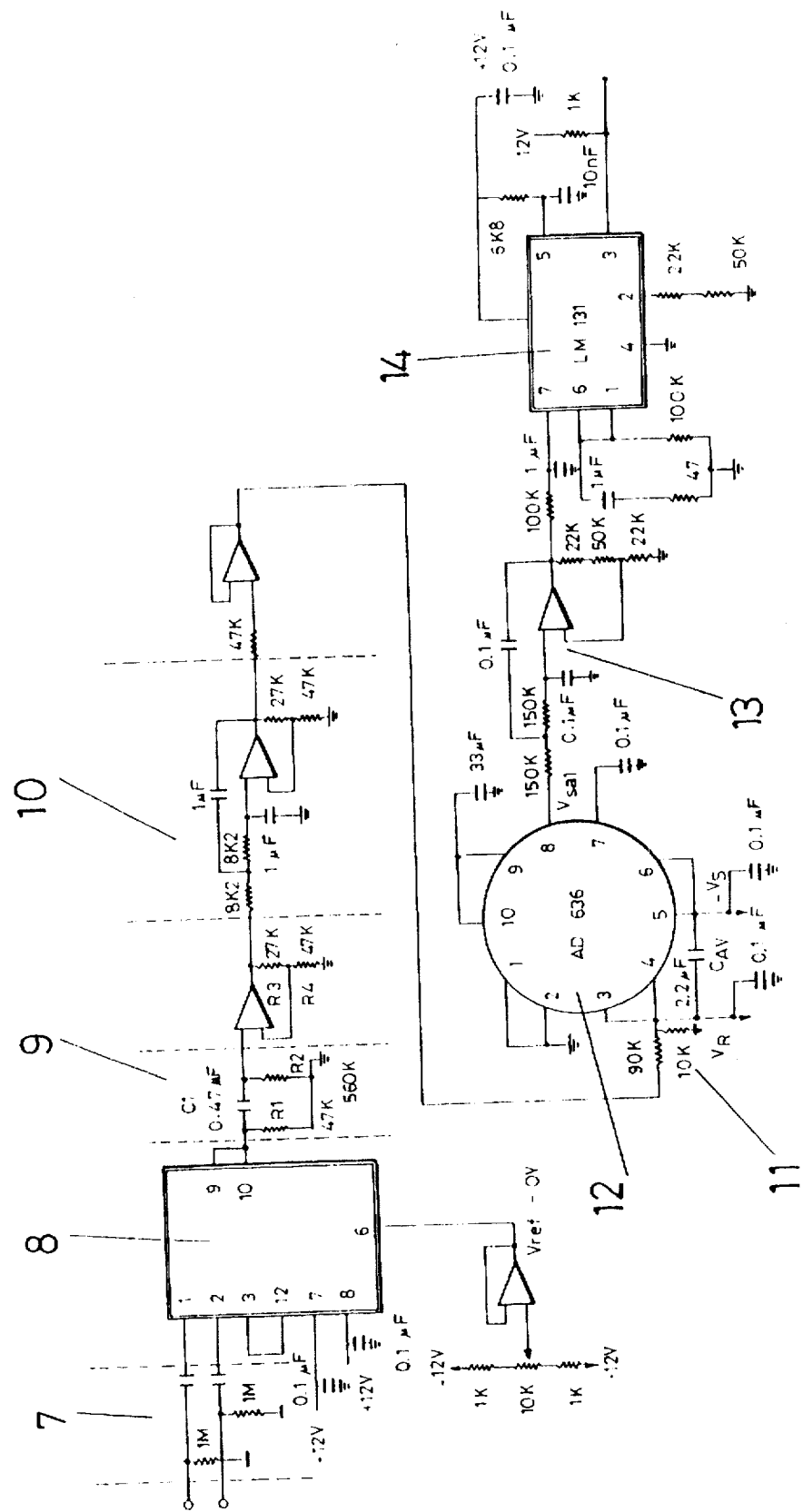
FIG. 4 is the electronic chart for the block diagram in the previous figure, from signal-capture to its output as continuous tension value at a maximum level of two volts.

In the signal processing circuit shown in block diagram form in FIG. 3, the part for amplification and processing of the signal, developed in FIG. 4, consists of a capacitive conduction suppressor (7), an amplifier based on an AD 524 circuit (8) in the form of a high-precision instrumentation amplifier operable in extreme conditions. In all data-capture systems, this circuit combines characteristics enabling fully simplified designs merely by control of the differential amplification, with a high degree of linearity, a very high common-mode rejection factor, low drift level and very low noise level.

The amplifier output (8) is made to flow through two high-pass (9) and low-pass (10) filters designed using operational amplifiers with adaptation modules 15, 16 inserted between them and using the same type of circuits, then flowing through an attenuator unit (11) to a true effective value convertor (12).

The attenuator unit (11) adapts the signal levels to the values of the true effective value conversion circuit since the maximum tension which can be applied to it is 200 mVef, and the maximum peak rate is related to that value.

The effective value convertor (12) is based on an AD 636 integrated circuit which carries out this function in close relation with the attenuator unit (11), at the output from which an amplifier (13) is fitted to amplify the conversion circuit signal (12) to a continuous value providing an easily processed and analyzed signal. For these purposes, a gain amplifier 10 is required, with very low noise level and a maximum output tension of 2 volts. At the output of the amplifer (13) is a stand alone voltage to frequency converter (14), which is basic configuration of the LM 131 integrated circuit.

In practice, the circuit sections described are assembled on a printed circuit board. The plate where the excitation block is situated also contains the electrode signal capture and treatment elements.

All this provides a reliable flow metering structure which is compact in terms of use and which can incorporate both flow direction detection elements and control components such as a microprocessor, to facilitate not only the exchange of orders within the system but also the configuration of the visualization section. This gives a clear idea of the versatility of the proposed electromagnetic flow meter.

We claim:

1. Control circuits for an electromagnetic flow meter which include an excitation block (2) and a metering signal processing circuit, said excitation block comprising an excitation control signal generating circuit which generates a base control wave of zero continuous level and a working cycle of 50%, to provide a signal at the input to an integrated circuit (6) which excites coils B1 and B2, the excitation control signal generating circuit consists of a generator (4) followed by a continuous level suppressor and an amplifier (5), while the metering signal processing circuit consists of a capacitive conduction suppressor (7) and an amplifier (8), the output from which runs through high- and low-pass filters (9) and (10) formed by operational amplifiers with adaptation modules inserted between them using the same type of circuitry and thence through an attenuator unit (11) to a true effective value convertor (12).

2. Control circuits for an electromagnetic flow meter as set forth in claim 1, wherein the excitation control signal generator circuit and the continuous level suppressor and amplifier take the form of an oscillator, a high-pass filter and an amplifier implemented by means of an operational amplifier.

3. Control circuits for an electromagnetic flow meter as set forth in claim 1, wherein the integrated circuit (6) is an input tension-controlled transadmittance integrated LSI circuit which can supply a current with gain loop adjustment through end components.

4. Control circuits for an electromagnetic flow meter as set forth in claims 1, wherein the excitation control signal generating circuit preferably generates a 6.5 Hz base control wave of zero continuous level, a 50% work cycle, and providing a signal of approximately+11 V at the input to the integrated circuit for the coils (B1) and (B2).

5. Control circuits for an electromagnetic flow meter as set forth in claim 1, wherein the amplifier (8) of the metering signal processing circuit is a high-precision instrumentation amplifier which can operate in extreme conditions.

6. Control circuits for an electromagnetic flow meter as set forth in claim 1, wherein the true effective value convertor (12) is based on an integrated circuit closely linked to the attenuator unit (11) at whose output an amplifier (13) is installed to amplify the conversion circuit signal (12) to a continuous value providing a signal which is easily processed and analyzed.

* * * * *